(12) United States Patent
Gustafsson et al.

(10) Patent No.: US 6,259,747 B1
(45) Date of Patent: Jul. 10, 2001

(54) IQ MODULATOR, AND ASSOCIATED METHOD

(75) Inventors: Kjell Gustafsson; Torsten Carlsson, both of Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 08/822,244

(22) Filed: Mar. 20, 1997

(51) Int. Cl.$^7$ ........................................................ H03C 3/00
(52) U.S. Cl. ............................................. 375/298; 332/103
(58) Field of Search ............................... 375/296, 298, 375/295; 332/126, 103, 107

(56) References Cited

U.S. PATENT DOCUMENTS 5,351,016 * 9/1994 Dent ..................................... 375/296
5,374,903   12/1994 Blanton ................................... 331/4

FOREIGN PATENT DOCUMENTS 0 782 063 A1   7/1997   (EP) .
WO 96/17287    6/1996   (WO) .

OTHER PUBLICATIONS

EPO International Search Report dated Oct. 30, 1998.
C.S. Koukourtis, P.H. Houlis and J.N. Sahalos; A General Purpose Differential Digital Modulator Implementation Incorporating a Direct Digital Synthesis Method: 8086 IEEE Transactions on Broadcasting, 39 (1993) Dec., No. 4, New York, NY; pp. 383–388.
Hickman; Putting DDS to Work; 8140 Electronics World + Wireless World 98 (1992) Nov., No. 1679, Sutton, Surrey, GB; pp. 937–941.
Paul O'Leary and Franco Maloberti; A Direct–Digital Synthesizer with Improved Spectral Performance; 8089 IEEE Transactions on Communications 39 (1991) Jul., No. 7, New York, US; pp. 1046–1048.

* cited by examiner

Primary Examiner—Temesghen Ghebretinsae
Assistant Examiner—Kevin M Burd
(74) Attorney, Agent, or Firm—Jenkens & Gilchrist, P.C.

(57) ABSTRACT

An IQ modulator, and an associated method, for a digital transmitter. The IQ modulator forms I- and Q-components which modulate a carrier. The IQ modulator permits simple and quick introduction of frequency offsets to overcome the effects of Doppler shifting or to form channel offsets in an FDMA communication scheme.

20 Claims, 3 Drawing Sheets

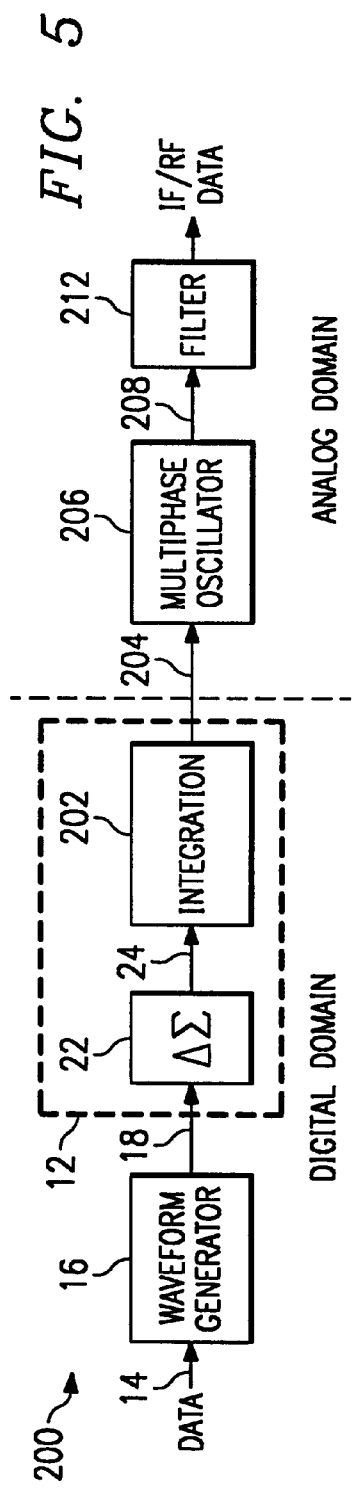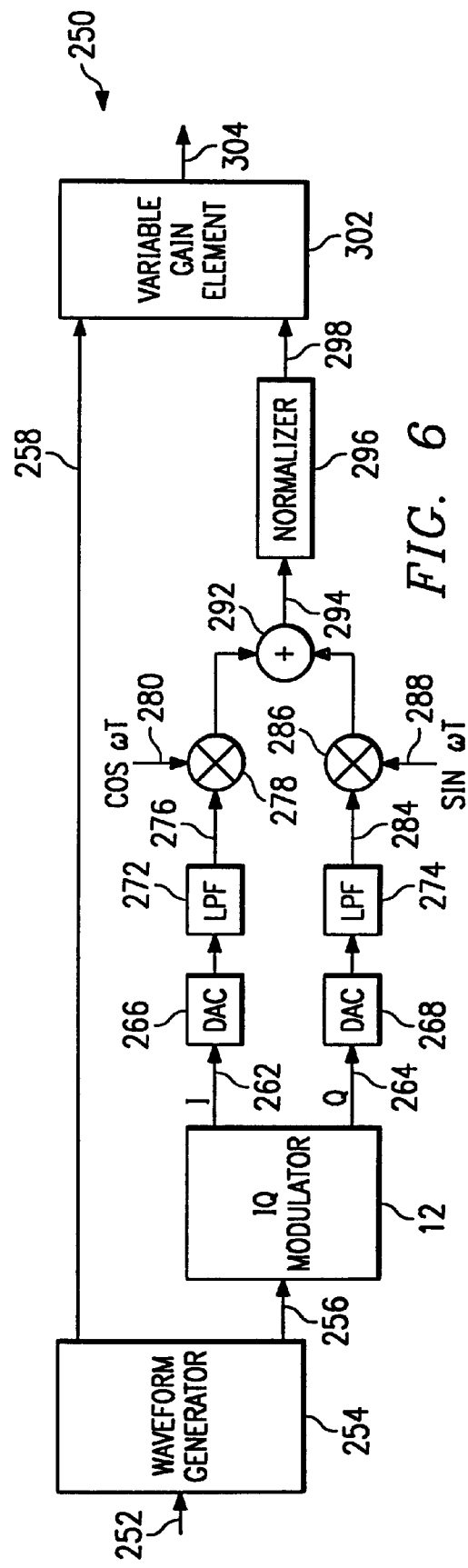

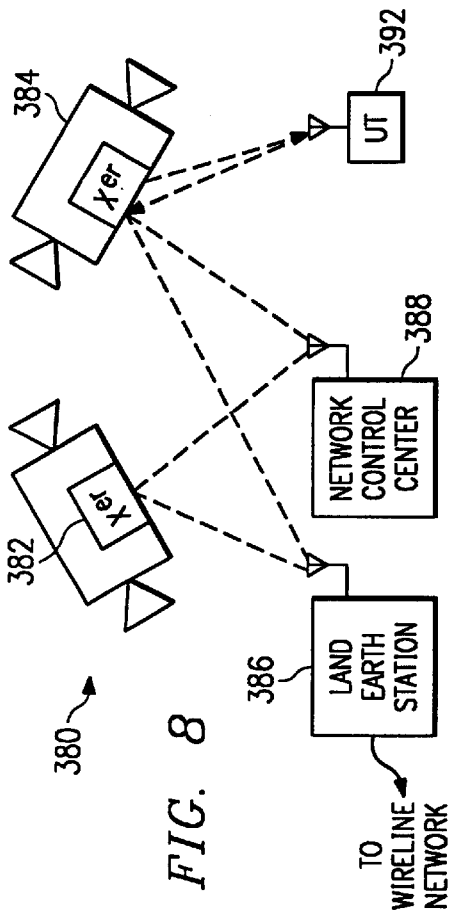
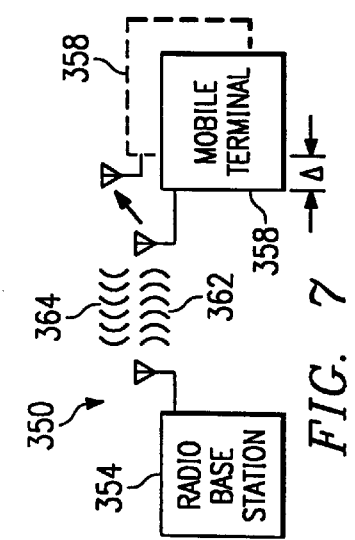
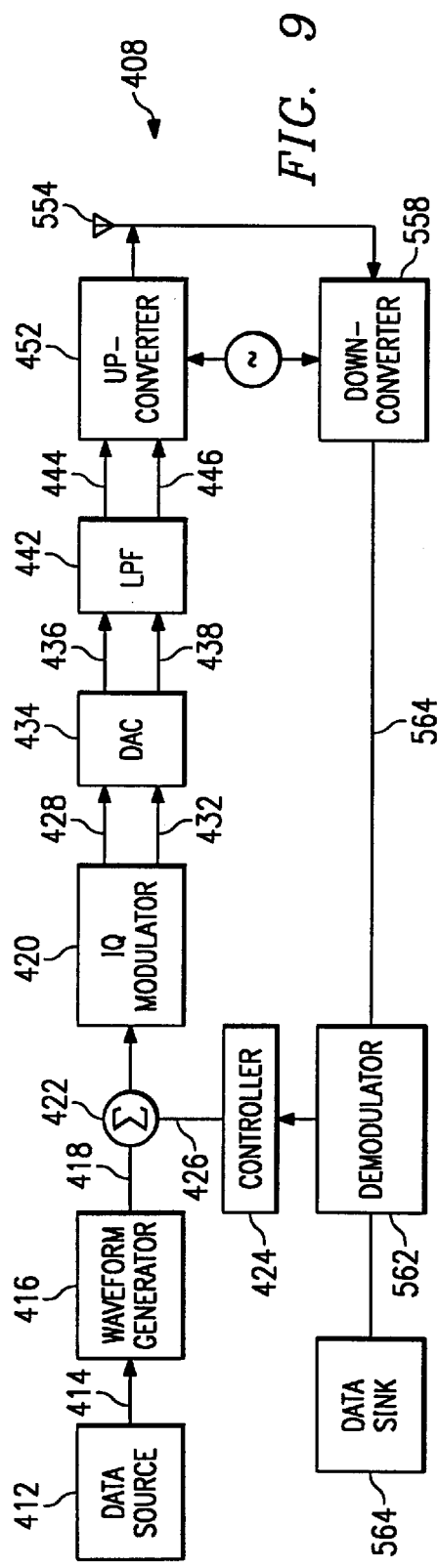

IQ MODULATOR, AND ASSOCIATED METHOD

The present invention relates generally to digital modulation techniques in which I (in-phase) and Q (quadrature-phase) components of an information signal are used in the generation of modulated signals. More particularly, the present invention relates to an IQ modulator, and an associated method, for forming the I and Q-components. Frequency offsets, such as those used to overcome the effects of Doppler shifts or to form channel offsets, are introduced without requiring a corresponding increase in modulator circuit or processing complexity.

The IQ modulator is advantageously embodied, e.g., in a mobile communication system, such as a satellite communication system or a terrestrial cellular communication system, in which relative movement between sending and receiving stations cause Doppler shifting of transmitted signals to be significant. The IQ modulator is also advantageously embodied, e.g., in an FDMA (Frequency-Division, Multiple-Access) communication system or in a communication system which utilizes frequency hopping. Channel offsets introduced into the I and Q-components permit modulated signals to be formed of desired frequency offsets to be transmitted at selected frequencies.

BACKGROUND OF THE INVENTION

A communication system is comprised, at a minimum, of a sending station and a receiving station interconnected by way of a communication channel. A radio communication system is a type of communication system in which the communication channel is formed of a portion of the electromagnetic spectrum. A cellular communication system is exemplary of a multi-user, radio communication system.

Communication capacity in a communication system is, in many instances, limited by the channel capacity of channels available to the communication system. In a radio communication system, for instance, the communication capacity of the system is sometimes limited by the bandwidth allocated to the communication system. Viz., a radio communication system is typically bandwidth-limited. Channels defined in the communication system must be within the bandwidth allocated thereto.

Digital modulation techniques are sometimes used to increase the effective capacity of a communication system. When digital modulation techniques are employed in a radio communication system, for instance, a lessened amount of frequency spectrum is required to effectuate the communication of a communication signal between a sending and a receiving station.

A composite modulation technique is sometimes utilized to form modulated signals. In composite modulation, information is encoded in both the amplitude and the phase of the modulated signal.

In conventional practice, data generated by a data source is provided to a waveform generator. The waveform generator generates digital samples corresponding to the base band I (in-phase) and Q (quadrature-phase) components. The waveforms are generated, for example, in real-time, or are stored in a memory element and selected responsive to input data. The sampling rate and the number of bits per sample of the I and Q-components are selected to represent the signal with sufficient accuracy. The I and Q samples are converted into analog form by digital-to-analog converters (DACs). Once converted into analog form, the samples are filtered by low-pass reconstruction filters. Such filters remove spectrum repetition caused by the sampled nature of the original signal. Once filtered, the I and Q signals are provided to a conventional, quadrature modulator. In conventional practice, a quadrature modulator separates a transmitter carrier source (or a carrier intermediate frequency source) into sine and cosine components. Each component is mixed with separate portions of an information signal input, and the mixed components are then summed. The resultant signal, if at an intermediate frequency (IF), is first up-converted in frequency and then amplified.

Sometimes, the digital-to-analog converter must be of a 10–14 bit resolution to represent the I and Q-components with adequate resolution. Implementation of DACs with such a multi-bit resolution is difficult to implement on the same integrated circuit chip as that upon which digital signal processing components are implemented.

A $\Delta\Sigma$ modulator is sometimes utilized to obviate the need for a DAC of such a high bit resolution. $\Delta\Sigma$ modulators are coupled to receive the I and Q-components formed by the waveform generator. The $\Delta\Sigma$ modulators create streams of digital samples at higher rates than the I and Q-components provided thereto, but each sample created by the $\Delta\Sigma$ modulators are of smaller bit lengths. The reduced number of bits of which the samples formed by the $\Delta\Sigma$ modulators permits the DACs to be of smaller bit resolutions.

Selection of the number of bits of which the samples formed by the $\Delta\Sigma$ modulators can be balanced with the over sampling factor, i.e., the rate at which the $\Delta\Sigma$ modulators generate samples responsive to the I and Q component samples provided thereto. At increased sampling rates, the number of bits of which each sample is formed is reduced. At a great enough over sampling factor, the samples can be merely of single bits thereby making the DACs trivial to implement.

Additional circuit complexity is required of the circuitry which forms the I and Q representation of the base band signal when the signal must be offset slightly in frequency. Frequency offset is required, for instance, to compensate for effects of Doppler shifting. Doppler shifting is sometimes significant in communication systems when sending and receiving stations move rapidly relative to one another. Communications in a satellite communication system, such as a satellite-cellular communication system, or a terrestrial cellular communication system are sometimes affected by Doppler effects. And, compensation must sometimes be made to counteract for the Doppler shifting.

A frequency domain representation of waveforms generated by a waveform generator can be advantageously utilized. That is to say, the waveform generator can be formed which generates output samples corresponding to instantaneous frequency deviations of the modulated signal. Such values of frequency can be integrated, i.e., summed in the digital domain, to obtain phase values. The phase values can be converted to I and Q samples through sine/cosine calculations to transform between polar and Cartesian coordinates. Because the sine/cosine calculations are needed to transform between the polar and Cartesian coordinates, the required circuitry is still of increased complexity.

A manner by which to provide an IQ modulator which permits frequency offsets to be introduced simply and without increasing circuit or processing complexity would be advantageous.

It is in light of this background information related to digital modulation techniques that the significant improvements of the present invention have evolved.

SUMMARY OF THE INVENTION

The present invention, accordingly, advantageously provides an IQ modulator, and an associated method, for modulating an information signal to form I and Q-components representative of the information signal. Use of the IQ modulator, and its associated method, for modulating an information signal permits frequency offsets, such as those used to overcome the effects of Doppler shifts or to form channel offsets to be introduced without requiring a corresponding increase in modulator circuit or processing complexity.

In one aspect of the present invention, the IQ modulator is advantageously embodied in a mobile communication system, such a satellite communication system or a terrestrial cellular communication system, in which relative movement between sending and receiving stations cause Doppler shifting to be significant. Frequency offsets are introduced to counteract for the effects of the Doppler shifting.

In another aspect of the present invention, the IQ modulator forms a portion of a transmitter operable in an FDMA (Frequency-Division, Multiple-Access) communication system. Channel offsets introduced into the I and Q-components permit modulated signals to be formed of desired frequency offsets to be transmitted at selected frequencies.

In another aspect of the present invention, the IQ modulator forms a portion of a transmitter operable to transmit signals pursuant to a frequency hopping scheme. Channel offsets introduced into the I and Q-components permit modulated signals to be formed of selected, frequency offsets to be transmitted at selected frequencies. Alteration of the levels of channel offsets permits the frequency-hopping scheme to be effectuated.

The IQ modulator permits a waveform representation of an information signal applied thereto to be in the frequency domain, thereby to facilitate frequency translation, while also providing for a simple transformation into an I/Q domain to form the I and Q-components. Transformation of an information signal into the I and Q-components while also introducing frequency offset into the information signal is effectuated without increasing circuit complexity or processing complexity.

In one aspect of the present invention, a $\Delta\Sigma$ modulator is utilized to convert a high-resolution signal, provided to the $\Delta\Sigma$ modulator at a relatively low sampling rate into a lower-resolution sample, generated an increased sampling rate. Appropriate selection of the resolution of the samples generated by the $\Delta\Sigma$ modulator facilitates conversion into the I/Q domain.

In these and other aspects, an IQ modulator, and an associated method, generates I and Q values which form the phase-modulated component of a modulated signal transmitted by a transmitter. The transmitter is operable to transmit the modulated signal which is formed of an information signal in which the modulated signal has at least a phase-modulated component. A translator is coupled to receive indications of frequency deviations of successive samples of the information signal. The translator translates the indications of the frequency deviations to form a translated signal. The translated signal is representative of phase changes between the successive samples of the information signal. A converter is coupled to receive the translated signal formed by the translator. The converter converts values of the translated signal into I and Q values wherein the I and Q values form the phase-modulated component of the modulated signal.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 5 illustrates a functional block diagram of a transmitter of another embodiment of the present invention.

FIG. 6 illustrates a functional block diagram of a transmitter of an embodiment of the present invention operable to generate a composite-modulated signal.

FIG. 7 illustrates a functional block diagram of a radio base station and a mobile terminal of a cellular communication system, exemplary of a communication system in which an embodiment of the present invention is operable.

FIG. 8 illustrates a functional block diagram of a portion of a satellite communication system in which an embodiment of the present invention is operable.

FIG. 9 illustrates a functional block diagram of a mobile terminal which an embodiment of the present invention forms a portion.

DETAILED DESCRIPTION

A narrow band, electromagnetic wave may be represented mathematically by a combination of a scaled sine wave and a scaled cosine wave by the following equation:

$$s(t)=I(t)\cos(wt)+Q(t)\sin(wt)$$

wherein:

I(t) is a function of time-scaling of the cosine component of a carrier, sometimes referred to as a I(in-phase) component;

Q(t) is a function of time-scaling of the sine component of the carrier, sometimes referred to as a Q(quadrature-phase) component;

w is the angular frequency of the carrier; and t is a value of time, typically seconds.

Such a representation of an electromagnetic wave is advantageously utilized in, inter alia, digital modulation techniques. The I- and Q-components of the electromagnetic wave form informational components which modulate the cosine and sine components of a carrier. Apparatus and methods, as noted above, are widely known and used to encode an information signal into such I- and Q-components to facilitate the formation of a modulated signal.

Figure 1:
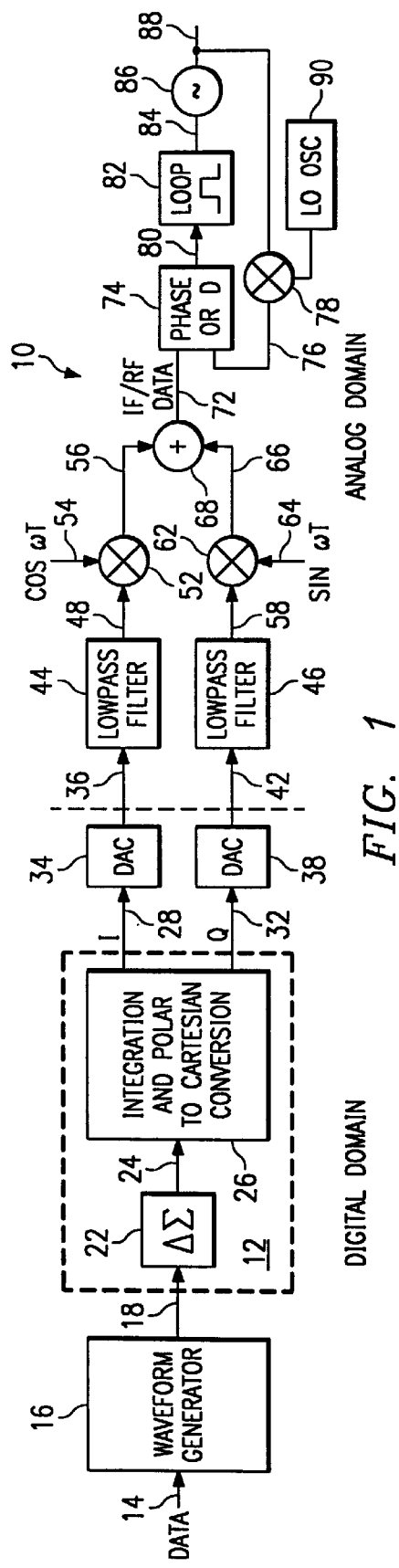
FIG. 1 illustrates a functional block diagram of a transmitter including the IQ modulator of an embodiment of the present invention.

FIG. 1 illustrates a transmitter, shown generally at 10, of the embodiment of the present invention. The transmitter 10 is operable in a radio communication system to form a modulated, electromagnetic wave at a selected radio frequency. During operation of the transmitter, indications of an information signal are encoded to form I- and Q-components which are then modulated upon a carrier to form the modulated, electromagnetic wave. The I- and Q-components are used to phase modulate the carrier.

The transmitter 10 includes an IQ modulator 12 for forming the I- and Q-components used to modulate a carrier to form the modulated, electromagnetic wave. As shall be described below, frequency offsets can also be quickly and simply introduced upon information signals which are to be transmitted by the transmitter. Such frequency offsets are introduced, for example, to counteract for the effects of Doppler shifts or to create channel offset to facilitate channelized communications in, for example, an FDMA (Frequency-Division, Multiple-Access) communication scheme.

A data signal, such as a data signal generated by a data source (not shown in FIG. 1) is provided to the transmitter 10 by way of line 14. Line 14 is coupled to a waveform generator 16 to receive the data signal thereafter. The waveform generator 16 is operable to generate an information signal on line 18 formed of successive samples. The samples are each of values indicative of instantaneous frequency deviations. And, the instantaneous frequency deviations are responsive to values of the data signal applied to the waveform generator 16.

The samples forming the information signal generated on the line 18 are each of a selected bit length. The bit length of each sample is referred to as the resolution of the sample. And, the samples are generated at a selected rate. Thereby, the number of bits forming the information signal generated on the line 18 is a function of both the resolution of the samples and also the rate at which the samples are generated.

The line 18 is coupled to a translator, here a ΔΣ modulator 22, of the IQ modulator 12. The ΔΣ modulator 22 is operable to generate a translated signal on line 24 also formed of sequences of samples.

The samples forming the translated signal generated by the ΔΣ modulator 22 are of lessened resolutions compared to the resolution of the samples forming the information signal applied to the ΔΣ modulator. And, the samples are generated at an increased rate relative to the rate at which the samples forming the information signal are generated. Such increased sampling rate is sometimes referred to as "oversampling."

The line 24 is coupled to an integration and polar to Cartesian converter 26. The converter 26 is operable to integrate the signal provided thereto. Because the samples forming the signal provided to the converter 26 are representative of instantaneous frequency changes, such integration is performed by summing the values of instantaneous frequency. And, as the integral of frequency is phase, the integration here forms values of phase, represented in polar form. Then, the phase values are converted from polar form into Cartesian form. The coordinates formed therefrom form the I- and Q-components. Values are of the I- and Q-components into which the translated signals are converted by the converter 26 are generated on lines 28 and 32, respectively.

The line 28 is coupled to a digital-to-analog converter 34 whereat the values of the I component are converted to analog form. An analog, I-component signal is generated on the line 36 responsive thereto. Analogously, the line 32 is coupled to a digital-to-analog converter 38 whereat values of the Q-component are converted into analog form. An analog, Q-component signal indicative thereof is generated on the line 42.

The lines 36 and 42 are coupled to low pass filters 44 and 46, respectively. The low pass filters 44 and 46 are of filter characteristics to filter quantization noise generated as a result of operation of the IQ modulator 12. The filters pass the I- and Q-component values which, here, are of baseband frequencies.

Values of the filtered, I-component are generated on the line 48 and provided to an input of a mixer 52. An up-mixing signal of a selected frequency is also provided to the mixer 52 by way of line 54. The mixer generates an up-mixed signal on line 56.

Filtered values of the Q-component are provided by way of line 58 to a mixer 62. An up-mixing signal of the selected transmitted frequency is also provided to the mixer 62, here by way of line 64. The mixer 62 generates an up-mixed signal on the line 66. The mixing signals provided on the lines 54 and 64 are ninety degrees out of phase with one another.

The lines 56 and 66 are provided to a summer 68 which sums the signals theretogether and forms an IF transmit signal on the line 72.

The line 72 is coupled to a phase detector 74 which forms a portion of a phase-locked loop. The phase detector 74 also receives an input on line 76 generated by a mixer 78. The phase detector 74 generates a phase difference signal on line 80 which is provided to a loop filter 82, which generates a signal on line 84 to control a VCO 86. The VCO generates a transmit signal on line 88. Line 88 is also coupled to the mixer 78. The mixer 78 is also coupled to receive a signal generated by an oscillator 90.

Figure 2:
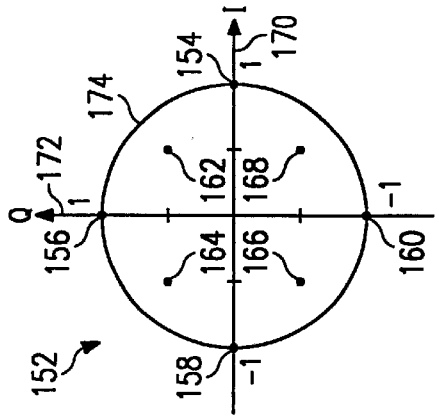
FIG. 2 illustrates a signal constellation of constellation points, values of which are generated by the IQ modulator show in FIG. 1 according to an embodiment of the present invention.

FIG. 2 illustrates an exemplary constellation of signal values formed by the ΔΣ modulator 22. Samples generated by the modulator 22 are here of single bit values. When the samples are of such single-bit values, the I- and Q-components can each be of either of two bi-polar values, namely +1 and −1. Therefore, four possible combinations of I- and Q-components are possible. Such values are indicated in the constellation set 92 in which the possible I-component values are plotted on the abscissa axis 94 and the possible Q-component values are plotted on the ordinate axis 96.

The ΔΣ modulator 22, when operable to generate singlebit samples, generates a trinary output in which an output sample is of three possible values, namely, −1, 0, or 1. Such three values correspond to a π/2, 0, or −π/2 changing phase of the output. The samples forming the translated signal generated by the ΔΣ modulator can be interpreted to be the change in phase. Such change in phase provides the integration required to convert instantaneous frequency values to phase values.

The constellation set 92 shown in FIG. 2 illustrates the four possible combinations of I- and Q-component values. Namely, the constellation points 102, 104, 106, and 108 positioned about a unit circle 112 represent the four possible combinations of I- and Q-component values. The point 102 is of Cartesian coordinate values of (1, 1). Point 104 is of Cartesian coordinates of (1, −1); Point 106 of Cartesian coordinates (−1, −1); and Point 108 is of Cartesian coordinates (1, −1). Such points 102–108 can also be represented in polar form with angular positions of π/4, 3π/4, 5π/4, and 7π/4 respectively. Because the points can be represented in both the Cartesian and polar forms, only a trivial mapping is required to convert values from polar to Cartesian form.

The ΔΣ modulator 22 is capable of creating maximum frequency deviations proportional to the sampling frequency of the ΔΣ modulator. More particularly, the maximum frequency deviation that the modulator 22 is capable of creating corresponds to $f_s/4$, where $f_s$ is the sampling frequency of the modulator. A constant stream of 1 or −1 is created by the modulator 22. Thereby, each sample is shifted by a π/2 phase shift. And, such phase shift sets the scaling of input to the modulator 22 in that the input value that causes the modulator to saturate also corresponds to the same frequency deviation of $f_s/4$.

Figure 3:
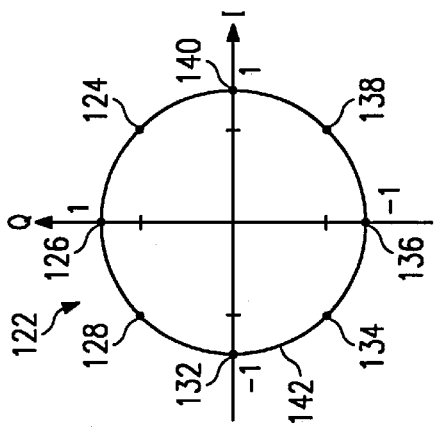
FIG. 3 illustrates a signal constellation of constellation points, similar to that shown in FIG. 2, but generated by the IQ modulator of another embodiment of the present invention.

FIG. 3 illustrates a constellation set 122 utilized by an IQ modulator 12 of another embodiment of the present invention. Here, eight constellation points, constellation points 124, 126, 128, 132, 134, 136, 138, and 140 are defined upon a unit circle 142. Here, the points 124–140 are spaced apart about the unit circle 142 by phase spacings of $\pi/4$. To form the points of the constellation set 122, the modulator 22 generates a greater number of output levels compared to an embodiment in which the modulator utilizes the constellation set 92, shown in FIG. 2. Unique encoding of phase changes of 0, + and $-\pi/4$, + and $-\pi/2$, and + and $-3\pi/4$ radian phase changes are provided.

In one embodiment, the $\Delta\Sigma$ modulator 22 forms a five-valued output of 0, + or −1, or + or −2 corresponding to a 0, $\pi/4$, or $\pi/2$ phase change, respectively. In other embodiments, constellation sets having greater numbers of constellation points and $\Delta\Sigma$ modulators having greater numbers of output levels can analogously be formed.

The constellation sets 92 and 122 shown in FIGS. 2 and 3 are all formed of points located on a unit circle. Greater design freedoms would be permitted of the digital-to-analog converters 34 and 38 of the transmitter 10 (shown in FIG. 1) if the converters are permitted to have a non-unity magnitude.

Figure 4:
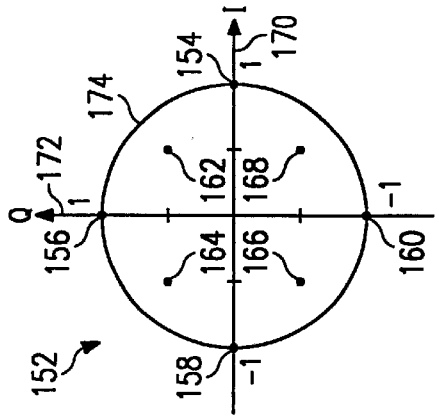
FIG. 4 illustrates another signal constellation, similar to those shown in FIGS. 2 and 3, but of constellation points generated by the IQ modulator of another embodiment of the present invention.

FIG. 4 illustrates a constellation set 152 having eight constellation points 154, 156, 158, 160, 162, 164, 166, and 168. The points 154–160 are positioned on the abscissa and ordinate axes 170 and 172 and on the unit circle 174. The points 162–168 are positioned within the unit circle 174. The digital-to-analog converters coupled to receive values of I- and Q-components generated by an IQ modulator 12 having values corresponding to those permitted by the constellation set 152 must be able to generate output values of 0, + and −½, and + and −1 to represent properly the I- and Q-components. Construction of a digital-to-analog converter required to be capable of generating such output values might be simpler to construct than a corresponding converter required to generate output signals all values located on a unit circle, such as is required to implement the constellation set 122 shown in FIG. 3.

As the phase values of the constellation points of the constellation sets 122 and 152 are identical, mapping required to be performed by the converter 26 to convert samples forming the translated signal generated by the $\Delta\Sigma$ modulator to correspond. While utilization of a constellation set having non unity-magnitude points introduces magnitude variations in signals produced therefrom, if only phase information of this signal is utilized, such magnitude variation is permissible. For instance, the phase information of a signal created utilizing such a constellation scheme can be used as a reference input to a phase detector of a phase locked loop.

The constellation sets shown in FIGS. 2 and 3 can be interpreted as a set of output phases for an oscillator at an IF (Intermediate Frequency) or RF (Radio Frequency) carrier frequency.

FIG. 5 illustrates a transmitter, shown generally at 200, of another embodiment of the present invention. A data signal is provided by way of line 14 to a waveform generator 16. The waveform generator 16 is operable in a manner analogous to the like-numbered waveform generator shown in FIG. 1. Viz., the waveform generator generates an informational signal on line 18. The informational signal generated on line 18 is formed of successive samples representative of instantaneous of frequency deviations which are to be introduced upon a signal to be transmitted by the transmitter 200. Again, each sample is of a selected resolution, and the samples are generated at a selected rate.

The line 18 is coupled to a $\Delta\Sigma$ modulator 22 which, again, is operable to generate, on the line 24, an over-sampled, low-resolution representation of the samples forming the information signal on the line 18.

The line 24 is coupled to an integrator 202. The integrator 202 is operable to integrate the samples of the instantaneous frequency deviation received thereat. Such integration is performed by a summing process. The integrator 202 further forms a phase-value signal on the line 204 which is coupled to a multi-phase oscillator 206. The multi-phase oscillator 206 is operable to generate a multi-phase signal on the line 208 which is coupled to a bandpass filter 212. The filter 212 is of filter characteristics to remove quantization noise introduced through operation of the $\Delta\Sigma$ modulator 22.

The transmitter 200, in various embodiments, is operable to utilize a selected constellation set, such as the constellation set 92 shown in FIG. 2 to form a transmit signal. When the transmitter 200 is operable to utilize the constellation set 92, the multi-phase oscillator must be capable of generating a transmit signal having any of four different phases, each separated by a phase difference of $\pi/2$. Here, I- and Q-components are provided to the multi-phase oscillator 206. And, values of such components are determinative of the value of the phase-value signal generated on the line 208.

Utilization of other constellation sets by multi-phase oscillators capable of generating other values of phase-value signals can similarly be implemented. An increase in the number of phases capable of being generated by the multi-phase oscillator correspondingly improves the phase resolution and freedom in choosing more output levels from the $\Delta\Sigma$ modulator.

FIG. 6 illustrates a transmitter, shown generally at 250, of another embodiment of the present invention. The transmitter 250 is operable to form a composite-modulated signal having both a phase-modulated component and an amplitude-modulated component. A data signal is here provided to the transmitter 250 by way of the line 252. The line 252 is coupled to a waveform generator 254. The waveform generator is here operable both to generate an information signal on the line 256 representative of instantaneous frequency deviations which are to be introduced upon a transmitted signal generated by the transmitter 250 and also to generate an information signal on the line 258 representative of amplitudes of the envelope of the transmit signal to be formed by the transmitter 250.

The line 256 is coupled to an IQ modulator 12, like-numbered and operable in manners analogous to operation of the IQ modulator shown previously in FIG. 1. That is to say, the modulator 12 generates I- and Q-components, here on lines 262 and 264, which are coupled to digital-to-analog converters 266 and 268, respectively. Once converted into analog form, the I and Q-components are filtered by low pass filters 272 and 274, respectively. Filtered values of the I-component are provided by way of line 276 to a mixer 278. The mixer 278 is also coupled to receive an up-mixing signal on line 280.

Analogously, values of the filtered, Q-component are provided by way of line 284 to a mixer 286. The mixer 286 is also coupled to receive an up-mixing signal on the line 288. The up-mixing signals provided by way of the lines 280 and 288 are 90 degrees out of phase relative to one another.

Up-mixed signals generated by the mixers 278 and 286 are provided to a summer 292 which sums the up-mixed signals provided thereto and generates an upconverted signal on the line 294 which is coupled to a normalizer 296. The normalizer 296 is operable to normalize the signal provided thereto and to generate a normalized signal on the line 298 which is provided to a variable gain element 302.

The variable gain element is operable to amplify the normalized, signal provided thereto by a selected gain level. The line 258 is also coupled to the variable gain element 302, and the value generated thereon is determinative of the amount of gain by which the normalized signal is amplified. Thereby, the normalized signal is amplitude-modulated. The variable gain element 302 generates an amplified signal on the line 304.

FIG. 7 illustrates portions of a cellular communication system, shown generally at 350, in which an embodiment of the present invention is implemented. The portions of the cellular communication system pictured in the figure include a radio base station 354 and a mobile terminal 358. Downlink signals are 362 are transmitted by the base station 354 to the mobile terminal 358. And, uplink signals 364 are generated by the mobile terminal 358 for transmission to the radio base station. Two-way communication is thereby permitted between the base station and mobile terminal.

The mobile terminal is, by its nature, permitted movement relative to the radio base station. If the velocity of such movement is significant, Doppler shifting can interfere with communications between the base station and the mobile terminal.

By incorporating an embodiment of the present invention into the mobile terminal, frequency offsets can be simply and quickly introduced into uplink signals 364 transmitted by the mobile terminal to counteract for the effects of the Doppler shifting. Analogously, operation of an embodiment of the present invention in the radio base station 354 similarly can introduce frequency offsets in downlink signals 362 transmitted to the mobile terminal to overcome the effects of Doppler shifting.

FIG. 7 further includes an indication of the position of the mobile terminal, indicated by 358' when the mobile terminal is moving away from the radio base station 354. The spacing indicated by the distance 362 is exemplary of the distance traveled by the mobile terminal during a selected time period.

FIG. 8 illustrates a satellite, cellular communication system, shown generally at 380, in which an embodiment of the present invention is also operable. Communications between a satellite, such as the satellite 382 or the satellite 384, and an earth station, here a selected one of a land earth station 386, a network control center 388, or a user terminal 392 can be affected by Doppler shifting. Operation of an embodiment of the present invention introduces frequency offsets upon communication signals transmitted between the earth stations and the satellites to counteract for the effects of Doppler shifting. Also, if portions of the satellite communication system are operable pursuant to an FDMA communication scheme, channel offsets can similarly be introduced to provide channel spacing.

FIG. 9 illustrates a mobile terminal shown generally at 408. The mobile terminal 408 is representative of a mobile terminal operable in a terrestrial cellular communication system, such as the system 350 shown in FIG. 7 or the user terminal 392 shown to form a portion of the system 380 illustrated in FIG. 8.

The mobile terminal 408 is here shown to include a data source 412, such as a user's voice or computer data. The data forms a data signal in line 414 which is provided to a waveform generator 416.

The waveform generator 416 is operable to generate an information signal on line 418 formed of successive samples representative of instantaneous frequency deviations. Here, the line 418 is coupled to an input of a summing element 422. A control signal generated by a controller 424 on line 426 is provided to a second input of the summing element 422. The control signal is here representative of a frequency, the value of which is used to offset the signal applied to the summing element of line 418. The summing element 422 generates a summed signal which is coupled to an IQ modulator 420. The IQ modulator 420 is operable in manners analogous to operation of the IQ modulator 12 shown in FIG. 1.

Successive values of I-components and Q-components are generated on the lines 428 and 432 which are provided to a digital-to-analog converter circuit 434. The circuit 434 converts the I-components and Q-components into analog form on the lines 436 and 438. The lines 436 and 438 are coupled to a low pass filter 442 which filters quantization noise out of the signals applied thereto and generates values of filtered I- and Q-components on the lines 444 and 446. The lines 444 and 446 are coupled to an up-converter circuit 452 which up-converts and combines the signals provided thereto to form a transmit signal which is transmitted from the antenna 554. The up-converter might be formed of multiple stages.

Signals received by the mobile terminal 408 are downconverted by a down-converter 558 and provided to a demodulator 562 by way of the line 564. The demodulator demodulates a signal received thereat and provides demodulated signals to a data sink 564. The demodulator 562 is further coupled to the controller 424 to provide indications of portions of the signals received by the mobile terminal 408. Such indications include indications of frequency offsets which are to be introduced upon signals transmitted by the mobile terminal 408. The controller 424 is thereby operable to generate the control signal on the line 426 to introduce the frequency offset of a selected frequency offset level to counteract, for example, for the effects of Doppler shifting or to create channel offsets.

The various embodiments of the present invention advantageously provide apparatus, and an associated method, for a digital transmitter. Frequency offsets, such as those used overcome the effects of Doppler shifts or to form channel offsets are introduced without requiring the modulator circuit or processing complexity.

The previous descriptions are of preferred examples for implementing the invention, and the scope of the invention should not necessarily be limited by this description. The scope of the present invention is defined by the following claims.

What is claimed is:

1. In a transmitter for transmitting a modulated signal formed of a data signal, the modulated signal having at least a phase-modulated component, an improvement of an IQ modulator for generating I and Q values which form the phase-modulated component of the modulated signal, said IQ modulator comprising:

a translator coupled to receive an information signal formed of successive samples of a frequency deviation signal indicating frequency deviations to be introduced upon the data signal to form the modulated signal, said frequency deviations being responsive to values of the data signal, the information signal having a selected resolution and selected rate, said translator for translating the information signal to form a translated signal, the translated signal representative of phase changes between the successive samples of the frequency deviation signal, the translated signal having a resolution lower than the selected resolution of the information signal and a rate higher than the selected rate of the information signal; and a converter coupled to receive the translated signal formed by said translator, said converter for integrating said translated signal to form phase values in polar form indicative of said frequency deviations and for converting said phase values into Cartesian coordinates representative of I and Q values, the I and Q values forming the phase-modulated component of the modulated signal.

2. The IQ modulator of claim 1 wherein said translator translates the indications of frequency deviations of the successive samples of the information signal to form the translated signal where quantization noise is shaped to not substantially distort informational contents contained in the indications of the frequency deviations of the successive samples of the information signal.

3. The IQ modulator of claim 1 wherein said translator comprises a multi-valued quantizer.

4. The IQ modulator of claim 3 wherein each sample formed by said quantizer is of a single bit length.

5. The IQ modulator of claim 3 wherein said quantizer comprises a trinary quantizer.

6. The IQ modulator of claim 3 wherein said multi-valued quantizer forms a selected number of quantizing levels, the quantizing levels scaled such that a fixed constellation set is formed, each constellation point of the fixed constellation set defined by a value of an I-component and a value of a Q-component.

7. The IQ modulator of claim 6 wherein the value of an I-component and the value of a Q-component, of which each constellation point of the fixed constellation set is formed, are formed of positive and negative values of a selected level.

8. The IQ modulator of claim 1 wherein said translator comprises a $\Delta\Sigma$ modulator.

9. The IQ modulator of claim 1 further comprising a multi phase oscillator coupled to receive the phase values formed by said converter.

10. The IQ modulator of claim 1 wherein the indications of the frequency deviations of the successive samples of the information signal include a frequency offset component portion, the frequency offset component portion for introducing a frequency offset in the successive samples of the information signal.

11. The IQ modulator of claim 10 wherein the transmitter forms a portion of a radio communication system, the transmitter for transmitting the modulated signal to a receiver, wherein the transmitter and the receiver move relative to one another, and wherein the frequency offset component portion of the indications of the frequency deviations of the successive samples of the information signal is of a value to compensate for Doppler shifting of the modulated signal when transmitted between the transmitter and the receiver.

12. The IQ modulator of claim 10 wherein the transmitter is operable in an FDMA (Frequency-Division, Multiple-Access) communication system and wherein the frequency offset component portion of the indications of the frequency deviations of the successive samples of the information signal is of a value determinative of selection of a channel upon which the modulated signal is transmitted.

13. The IQ modulator of claim 1 further comprising an up-converter coupled to receive indications of the I and Q values formed by said converter and to receive an up-converting signal, said up-converter for forming an upconverted signal.

14. The IQ modulator of claim 13 further comprising a normalizer coupled to receive the up-converted signal, said normalizer for normalizing the up-converted signal.

15. The IQ modulator of claim 14 wherein said normalizer comprises an up-converting PLL (phase-locked loop).

16. A communication station for transmitting a modulated signal formed of a data signal, the modulated signal having at least a phase-modulated component, said communication station comprising:

a waveform generator coupled to receive the data signal, said waveform generator at least for generating an information signal formed of successive samples of a frequency deviation signal indicating frequency deviations to be introduced upon the data signal to form the modulated signal, said frequency deviations being responsive to values of the data signal, the information signal having a selected resolution and selected rate;

an IQ modulator having a translator therein coupled to receive the information signal, said translator for translating the information signal to form a translated signal, the translated signal representative of phase changes between the successive samples of the frequency deviation signal, the translated signal having a resolution lower than the selected resolution of the information signal and a rate higher than the selected rate of the information signal, said IQ modulator further having a converter therein coupled to receive the translated signal formed by said translator, said converter for integrating said translated signal to form phase values in polar form indicative of said frequency deviations, and for converting said phase values into cartesian coordinates representative of I and Q values, the I and Q values forming the phase-modulated component of the modulated signal;

a digital-to-analog conversion circuit coupled to receive the I and Q values formed by said converter, said digital-to-analog conversion circuit for converting the I and Q values into analog form; and an up-converter coupled to receive the I and Q values, once converted into analog form by said digital-to-analog conversion circuit, said up-converter for forming the modulated signal at a transmit frequency.

17. The communication station of claim 16 wherein the modulated signal comprises a composite-modulated signal further having an amplitude-modulated component and wherein said waveform generator further generates an amplitude signal indicating amplitudes of the waveform formed responsive to values of the data signal.

18. The communication station of claim 17 further comprising an amplifier having a controllable gain and coupled to receive the amplitude signal and at least indications of the I and Q values, said amplifier for amplifying the at least the indications of the I and Q values with a gain responsive to values of the amplitude signal.

19. In a method for transmitting a modulated signal form of a data signal, the modulated signal having at least a phase-modulated component, an improvement of a method for generating I and Q values which form the phase-modulated component of the modulated signal, said method comprising the steps of:

translating, by an IQ modulator, an information signal to a translated signal, the information signal being formed of successive samples of a frequency deviation signal indicating frequency deviations to be introduced upon the data signal to form the modulated signal, said frequency deviations being responsive to values of the data signal, the information signal having a selected resolution and selected rate, the translated signal representative of phase changes between the successive samples of the frequency deviation signal, the translated signal having a resolution lower than the selected resolution of the information signal and a rate higher than the selected rate of the information signal;

integrating, by said IQ modulator, said translated signal to form phase values in polar form indicative of said frequency deviations; and converting, by said IQ modulator, said phase values into cartesian coordinates representative of I and Q values, the I and Q values forming the phase-modulated component of the modulated signal.

20. A method for transmitting a modulated signal formed of a data signal, the modulated signal having at least a phase-modulated component, said method comprising the steps of:

generating an information signal formed of successive samples of a frequency deviation signal indicating frequency deviations to be introduced upon the data signal to form the modulated signal, said frequency deviations being responsive to values of the data signal, the information signal having a selected resolution and selected rate;

translating, by an IQ modulator, the information signal to form a translated signal, the translated signal representative of phase changes between the successive samples of the frequency deviation signal, the translated signal having a resolution lower than the selected resolution of the information signal and a rate higher than the selected rate of the information signal;

integrating, by said IQ modulator, said translated signal to form phase values in polar form indicative of said frequency deviations;

converting, by said IQ modulator, said phase values into cartesian coordinates representative of I and Q values, the I and Q values forming the phase-modulated component of the modulated signal;

converting the I and Q values into analog form;

up-converting the I and Q values, once converted into analog form to a transmission frequency; and combining the I and Q values to form the modulated signal.

\* \* \* \* \*